(12) United States Patent
Mehta et al.

(10) Patent No.: US 7,605,549 B2
(45) Date of Patent: Oct. 20, 2009

(54) SYSTEM AND METHOD FOR CURRENT AND/OR TEMPERATURE CONTROL OF LIGHT FIXTURE

(75) Inventors: Vinay Mehta, Germantown, TN (US);
Brendan Byrne, Germantown, TN (US)

(73) Assignee: Hunter Fan Company, Memphis, TN (US)

( * ) Notice: Subject to any disclaimer, the term of this patent is extended or adjusted under 35 U.S.C. 154(b) by 157 days.

(21) Appl. No.: 12/025,591

(22) Filed: Feb. 4, 2008

(65) Prior Publication Data
US 2008/0116826 A1      May 22, 2008

Related U.S. Application Data

(63) Continuation-in-part of application No. 11/712,856, filed on Mar. 1, 2007.

(60) Provisional application No. 60/840,352, filed on Aug. 28, 2006.

(51) Int. Cl.
*H05B 37/02* (2006.01)

(52) U.S. Cl. .................. 315/307; 315/225; 315/308; 315/119

(58) Field of Classification Search ............. 315/119, 315/125, 127, 128, 291, 307, 308, 224, 225
See application file for complete search history.

(56) References Cited

U.S. PATENT DOCUMENTS

| | | | |
|---|---|---|---|
| 4,675,777 A | 6/1987 | Watrous | 361/106 |
| 5,762,699 A * | 6/1998 | McGovern | 106/279 |
| 5,834,908 A | 11/1998 | Boland et al. | 315/307 |
| 5,909,090 A | 6/1999 | Nakamura et al. | 315/307 |
| 6,339,296 B1 * | 1/2002 | Goral | 315/86 |
| 2004/0100208 A1 | 5/2004 | Readio et al. | 315/291 |

FOREIGN PATENT DOCUMENTS

| | | |
|---|---|---|
| DE | 19739740 A1 | 10/1998 |
| GB | 2349959 A | 11/2000 |
| JP | 10284266 A | 10/1998 |

\* cited by examiner

*Primary Examiner*—David Hung Vu
(74) *Attorney, Agent, or Firm*—Baker Donelson

(57) ABSTRACT

A system for current and/or temperature control of light fixtures includes a sensor in communication with a light fixture, sense a current flow or a temperature of the light fixture, and communicate an input signal relative to the current flow or the temperature; a variable switch in communication with the light fixture to regulate the current flow of the light fixture in response to a control signal; and a controller in communication with the sensor and the variable switch to monitor the input signal, compare the input signal to a condition, and communicate the control signal to the variable switch to control its operation. A bypass circuit applies a normal current directly to the light fixture should a failure occur with the sensor, the variable switch or the controller. A method for current and/or temperature control of light fixtures includes providing the system, monitoring the current flow or the temperature of the light fixture; regulating the current flow of the light fixture, and bypassing the monitoring and regulating should a failure occur in the circuitry.

21 Claims, 6 Drawing Sheets

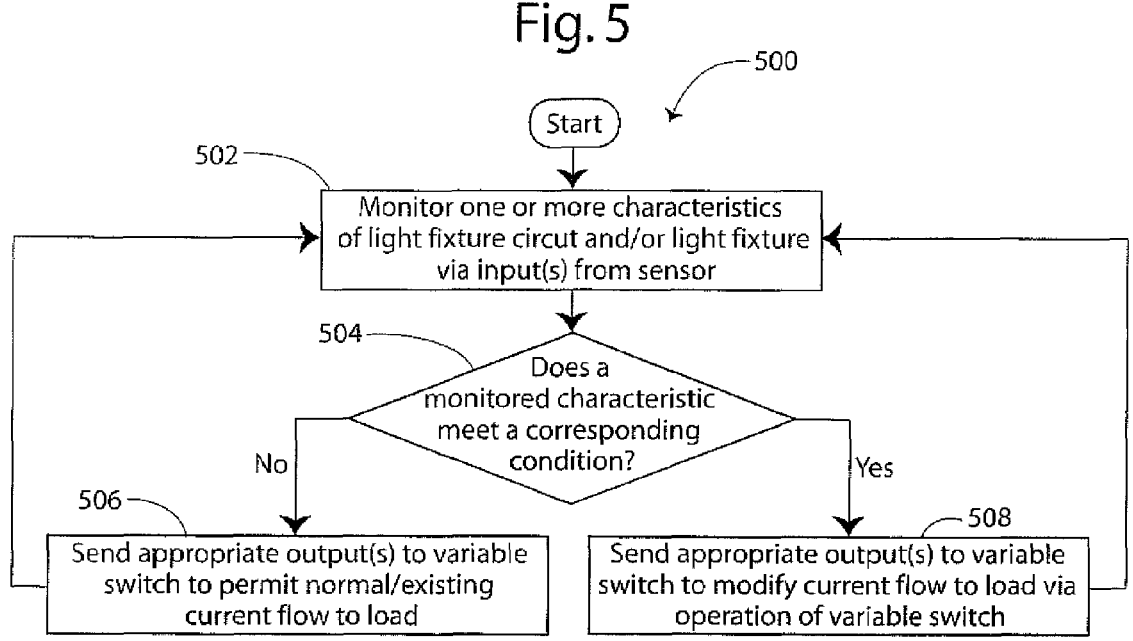
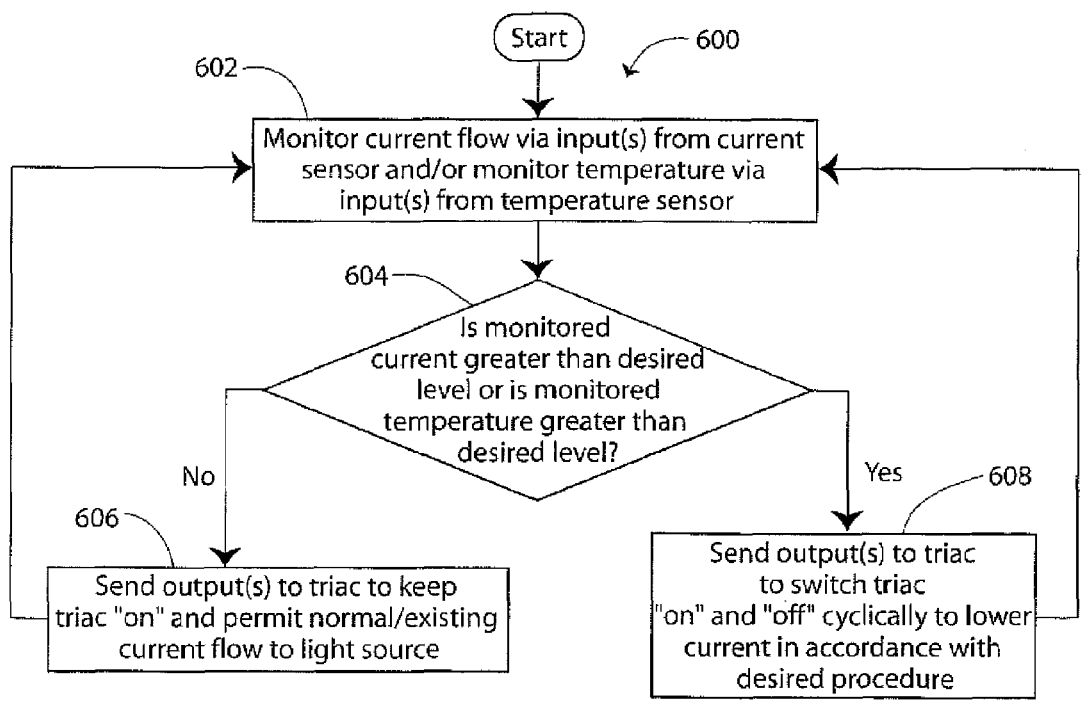

SYSTEM AND METHOD FOR CURRENT AND/OR TEMPERATURE CONTROL OF LIGHT FIXTURE

CROSS REFERENCE TO RELATED APPLICATION

This application is a continuation-in-part of U.S. patent application Ser. No. 11/712,856, entitled "System And Method For Current And/Or Temperature Control Of Light Fixture" and filed Mar. 1, 2007, which claims the benefit of priority to U.S. Provisional Patent Application Ser. No. 60/840,352, entitled "Wattage or Current Control Circuit Idea," and filed on Aug. 28, 2006, which is incorporated by reference herein.

TECHNICAL FIELD

This invention relates to light fixtures, and specifically to a system and method for current and/or temperature control of light fixtures.

BACKGROUND OF INVENTION

Light fixtures have been in use essentially ever since the introduction of electricity as a source of power in buildings and other environments. Modern light fixtures typically include at least a light source (such as a bulb or lamp) and a housing that supports and/or encloses the light source and connects it to an electrical power source (e.g., through a light socket and wiring). They may be attached to ceilings, walls, or other parts of a building's structure and may also be combined with other components. For example, the combination of a light fixture and a fan fixture (e.g., a ceiling fan) is common, for example, to provide fan/light combination fixture.

Typically, light fixtures have some limitations (e.g., due to their structure or design) on the amount of current and/or temperature they can sustain under normal, safe, and/or otherwise desirable operating conditions. For example, many light fixtures are designed to safely sustain the current and temperature that typically result during the operation of one or more 60 watt bulbs connected to a 120 volt power source. Such safe operating limits (also described as ratings) are typically labeled on the light fixture to inform the user.

However, a light source which operation may cause a higher than rated current and/or temperature to occur in a light fixture (e.g., a 75 watt bulb for a 60 watt rating) can usually be installed, whether intentionally (e.g., to obtain more light) or accidentally as an oversight. Such operation of a light fixture with a larger light source than it is rated to handle may result in abnormal, unsafe, or otherwise undesirable conditions, which can cause a loss of operation and significant damage to the light fixture and the surrounding environment, e.g., due to excessive heat, smoke, and/or fire.

Accordingly, it is seen that a need exists for a system and method to control the current and/or temperature of light fixtures to avoid a loss of operation and/or damage that may occur when a larger than rated light source is used with them. It is to the provision of such therefore that the present invention is primarily directed.

SUMMARY OF INVENTION

The invention, in accordance with exemplary embodiments described herein, provides a system and method for current and/or temperature control of light fixtures. An exemplary system of the invention can include a sensor structured to be in communication with a light fixture, sense a current flow or temperature of the light fixture, and communicate an input signal relative to the current flow or temperature; a variable switch structured to be in communication with the light fixture and regulate the current flow of the light fixture in response to a control signal; and a controller in communication with the sensor and the variable switch and structured to monitor the input signal communicated by the sensor, compare the input signal to a condition, and communicate the control signal to the variable switch to control its operation.

An exemplary method of the invention can include providing the foregoing exemplary system for current and/or temperature control of light fixtures; monitoring the current flow or temperature of the light fixture via communication of the input signal from the sensor to the controller; and regulating the current flow of the light fixture in response to the controller determining that the input signal meets the condition via the controller communicating the control signal to the variable switch.

BRIEF DESCRIPTION OF DRAWINGS

FIG. 5 is a flowchart diagram of a method for current and/or temperature control of light fixtures.

FIG. 6 is a flowchart diagram of a first sub-method of the method for current and/or temperature control of light fixtures shown in FIG. 5.

DETAILED DESCRIPTION

Figure 1:
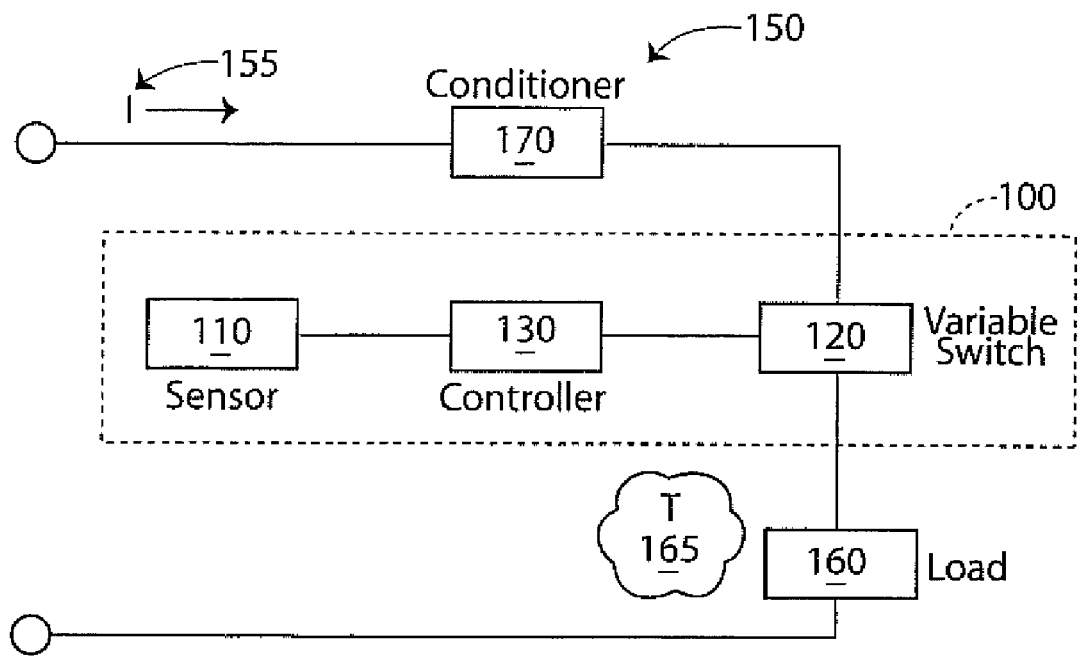
FIG. 1 is a block diagram of a system for current and/or temperature control of light fixtures.

With reference next to the drawings, FIG. 1 shows a block diagram of a system 100 for current and/or temperature control of light fixtures. The system 100 may be in communication with and/or integrated within a light fixture circuit 150. The system 100 includes a sensor 110 that is typically configured (structured, designed, etc.) to sense (measure, monitor, detect, etc.) one or more characteristics (conditions, parameters, etc.) of the light fixture circuit 150 and/or the light fixture (not depicted) and communicate information relative to the sensed characteristics (e.g., magnitude, frequency, etc.) to other devices or elements. For example, the sensor 110 may be structured to sense a current flow through or about one or more portions of the light fixture circuit 150, such as the depicted current flow 155, and communicate information relative to the current flow (e.g., magnitude, amount, etc.) to another device or element of the system 100. As another example, the sensor 110 may be structured to sense a temperature of or about one or more portions of the light fixture circuit 150 and/or the light fixture, such as the depicted temperature 165 in the vicinity of the load 160, and communicate information relative to the temperature to another device or element of the system 100. The sensor 110 may be configured to sense other characteristics of the light fixture circuit 150 or light fixture and communicate relative information thereof, which will be apparent in light of the disclosure herein.

The system 100 also includes a variable switch 120 that is configured to switch (e.g., on and/or off) one or more operating characteristics of the light fixture circuit 150. For example, the variable switch 120 may be configured to switch on or off the current flow 155 through the light fixture circuit 150. Moreover, the variable switch 120 may be configured to switch the current flow 155 or other operating characteristics on and off at a some cycle and/or frequency to affect the overall nature of the operating characteristic and in effect regulate the operating characteristic. For example, with respect to the current flow 155, the variable switch 120 may be structured to switch it on and off at a cyclical frequency that in effect modifies (e.g., decreases, increases, etc.) the resultant current flow 155 through one or more portions of the light fixture circuit 150, such as through the load 160. This feature will be appreciated, for example, with respect to modifying the magnitude of an alternating current (AC) operating characteristic. Moreover, it will be apparent based on the disclosure herein that the variable switch 120 may be structured to switch other operating characteristics of the light fixture circuit 150 and to switch in other ways (i.e., besides on/off, cyclical frequency, etc.).

The system 100 further includes a controller 130 that are typically in communication with the sensor 110 and variable switch 120 as depicted in FIG. 1. The controller 130 is typically configured to monitor and/or control the operation of one or more components in communication with the controller 130, such as the sensor 110 and variable switch 120. For example, the controller 130 may monitor one or more inputs (e.g., signals such as currents, voltages, etc.) received from the sensor 110. As another example, the controller 130 may control the operation of the variable switch 120 by one or more outputs (e.g., signals such as currents, voltages, etc.) sent to the variable switch 120. It will be apparent that the controller 130 can be configured to monitor or control other components (devices, systems, etc.), such as other components of the light fixture circuit 150.

The foregoing elements of the system 100, namely the sensor 110, variable switch 120, and controller 130, can be made (formed, manufactured, etc.) of one or more of numerous materials and/or components by one or more of numerous methods or processes, which will be apparent in light of the disclosure herein. For example, the sensor 110, variable switch 120, and/or controller 130 may include one or more electrical components (such as conductors, resistors, capacitors, transformers, etc.), electronic components (such as transistors, semiconductors, integrated circuits, chips, circuit boards, etc.), computing components (such as electronic logic, programmable logic, microprocessors, computing processors, etc.), etc. Several examples of such components which the sensor 110, variable switch 120, and/or controller 130 may include will be discussed below with respect to FIGS. 2-4. Furthermore, some examples of the operation of one or more of these elements of the system 100 will be discussed below with respect to FIGS. 5-8. It is also noted that elements of the system 100, such as the sensor 110, variable switch 120, and controller 130 may be separate components or integrated in various combinations, which will be apparent in light of the disclosure herein.

As mentioned above, the system 100 may be in communication with and/or integrated within a light fixture circuit 150. This light fixture circuit 150 may include various components, but typically includes at least a load 160 and may further include a conditioner 170 as depicted in FIG. 1. The load 160 typically includes a light source such as a lamp or light bulb, which can be utilized to provide light from a lighting fixture mounted. The conditioner 170 typically includes an inductor, capacitor, and/or other such components or equivalents thereof, which can provide filtering or other conditioning of various characteristics (e.g., undesirable) that exist in the light fixture circuit 150. For example, the conditioner 170 may filter or otherwise condition interference or other undesirable characteristics resulting from the operation of the load 160 or of one or more components of the system 100, such as the variable switch 120. The inclusion and use of the load 160, conditioner 170, and/or other components within the light fixture circuit 150 will be apparent in light of the disclosure herein, as will be the possible compositions and methods or processes of making such components.

Figure 2:
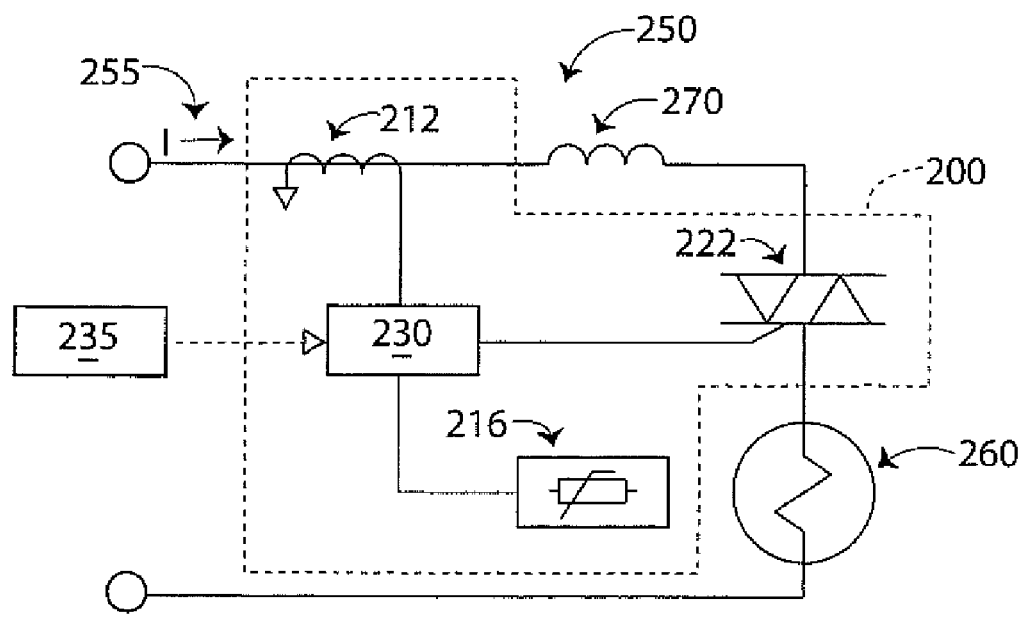
FIG. 2 is a diagram of a first exemplary circuit for the system for current and/or temperature control of light fixtures shown in FIG. 1.

FIG. 2 shows a diagram of a first exemplary circuit 200 for the system 100 for current and/or temperature control of light fixtures shown in FIG. 1. Similar to the system 100 of FIG. 1, the exemplary circuit 200 may be in communication with and/or integrated within a light fixture circuit 250. The circuit 200 may include a current sensor 212 that is configured to sense a current flow 255 through the light fixture circuit 250. As will be appreciated in light of the disclosure herein, the current sensor 212 may include one or more of numerous elements (components, devices, etc.). For example, the current sensor 212 may include a current transformer in communication with (e.g., connected to, in proximity therewith, etc.) the light fixture circuit 250 and also with the controller 230 so that the current sensor 212 can sense the current flow 255 and communicate characteristics of it (e.g., magnitude, polarity, etc.) to the controller 230 (e.g., via a signal such as a current, voltage, etc.). As another example, the current sensor 212 may include a transducer that is configured to sense the current flow 255 and communicate characteristics of it to the controller 230.

The circuit 200 may also include a temperature sensor 216 that is configured to sense a temperature of or about one or more portions of the light fixture circuit 250 or light fixture, such as the temperature of or in the vicinity of the light source 260 (discussed below). As will be appreciated in light of the disclosure herein, the temperature sensor 216 may also include one or more of numerous elements. For example, the temperature sensor 216 may include a thermal resistive device (or thermistor, as depicted in FIG. 2) in communication with the light fixture circuit 250 and/or light fixture and also with the controller 230 so that the temperature sensor 216 can sense the temperature and communicate characteristics of it (e.g., magnitude, variation, etc.) to the controller 230 (e.g., via a signal such as a current, voltage, etc.). As another example, the temperature sensor 216 may include a transducer that is configured to sense the temperature of or about one or more portions of the light fixture circuit 250 and/or light fixture and communicate characteristics of it to the controller 230.

The current sensor 212 and the temperature sensor 216 are examples of the sensor 110 discussed above for FIG. 1. It should be understood and will be apparent based on the disclosure herein that either the current sensor 212, the temperature sensor 216, or both sensors 212, 216 can be included and/or utilized in the circuit 200. Thus, some embodiments of the invention may include the current sensor 212, other embodiments may include the temperature sensor 216, and yet other embodiments may include both the current sensor 212 and the temperature sensor 216 as depicted for example in FIG. 2.

The circuit 200 also includes a triac 222 that is an example of the variable switch 120 discussed above for FIG. 1 and is configured to switch the current flow 255 on and off at a cyclical frequency to modify the current flow 255 that passes through the light source 260 and/or other elements of the light fixture circuit 250. Triacs are known in the art, including how to make and use them with respect to embodiments of the invention. Thus, as known in the art, the triac 222 includes two main terminals, which are connected to the light fixture circuit 250 and can allow the current flow 255 to pass through, and a gate terminal, which is connected to the controller 230 to receive signals that affect the operation of the triac 222 with respect to the current flow 255.

As mentioned above, the circuit 200 also includes a controller 230 that is in communication with the current sensor 212 and/or temperature sensor 216 (depending if one or both are included in the circuit 200 as discussed above) and with the triac 222. In some embodiments, the controller 230 may also be in communication with a remote control 235 as discussed below. The controller 230 is an example of the controller 130 discussed above for FIG. 1. The controller 230 is configured to receive signals from the current sensor 212 and/or temperature sensor 216 and, depending on the nature (e.g., magnitude, frequency, variation, etc.) of those input signals, to control the operation of the triac 222 by sending output signals to the gate terminal of the triac 222. Thus, the controller 230 may be said to trigger the triac 222 (as known in the art) depending on the inputs received from the current sensor 212 and/or temperature sensor 216. In some embodiments of the invention, the controller 230 may also control other characteristics that affect the light fixture circuit 250, such as switching on or off the feed to the light fixture circuit 250 from a power source (not depicted) or modifying the brightness of the light source 260 (e.g., as a dimmer control). It will be apparent based on the disclosure herein that the controller 230 (similar to the controller 130) may include one or more of numerous components that provide such configurations and functions, such as one or more electrical components, electronic components, computing components, etc. (some examples of which were presented above with respect to FIG. 1). In that regard, some examples of the operation (function, processing, etc.) of the controller 230 will be further discussed below with respect to FIGS. 5-8. Some specific examples of components of the controller 230 may include the Samsung S3C9454 8-bit general purpose controller or the OKI MSM64164C 4-bit micro-controller unit. It will also be apparent that the combination of one or more components of the controller 230 along with the triac 222 may form a system that is similar to a light dimmer control or dimmer switch. Moreover, the triac 222 may alternatively be another type of semi-conducting switch device, which are known in the art.

As previously mentioned, there may also be a remote control 235 in communication with the controller 230. As known in the art, the remote control 235 can allow a user to remotely transmit signals to the controller 230 (e.g., wirelessly via radio frequency signals) that may affect the operation of the controller 230 and thereby other components of the circuit 200, such as the triac 222. In that regard, the remote control 235 may be used, for example through operation of the controller 230, to turn the light source 260 on or off or to modify the brightness of the light source 260 (e.g., as a dimmer). Other operations that may be controlled using the remote control 235 will be apparent in light of the disclosure herein.

As also mentioned above, the circuit 200 may be in communication with and/or integrated within a light fixture circuit 250. This light fixture circuit 250 can include a light source 260, which is an example of a load 160 as discussed for FIG. 1. As known in the art, the light source 260 can be a light bulb, lamp, or other element that outputs some form of energy (e.g., visible light) when the current flow 255 passes through it. The light fixture circuit 250 can also include an inductor or RF coil 270, which is an example of a conditioner 170 as discussed for FIG. 1. As known in the art, the RF coil 270 can filter out undesirable characteristics of the current flow 255, the voltage (not depicted), or other signals within the light fixture circuit 250. As also known, such undesirable characteristics may include interference (e.g., radio, harmonic, etc.) caused by the one or more elements in communication with the light fixture circuit 250, such as the triac 222, which may cause undesirable operation of the light source 260 (e.g., flicker, unintended dimming, etc.).

Figure 3:
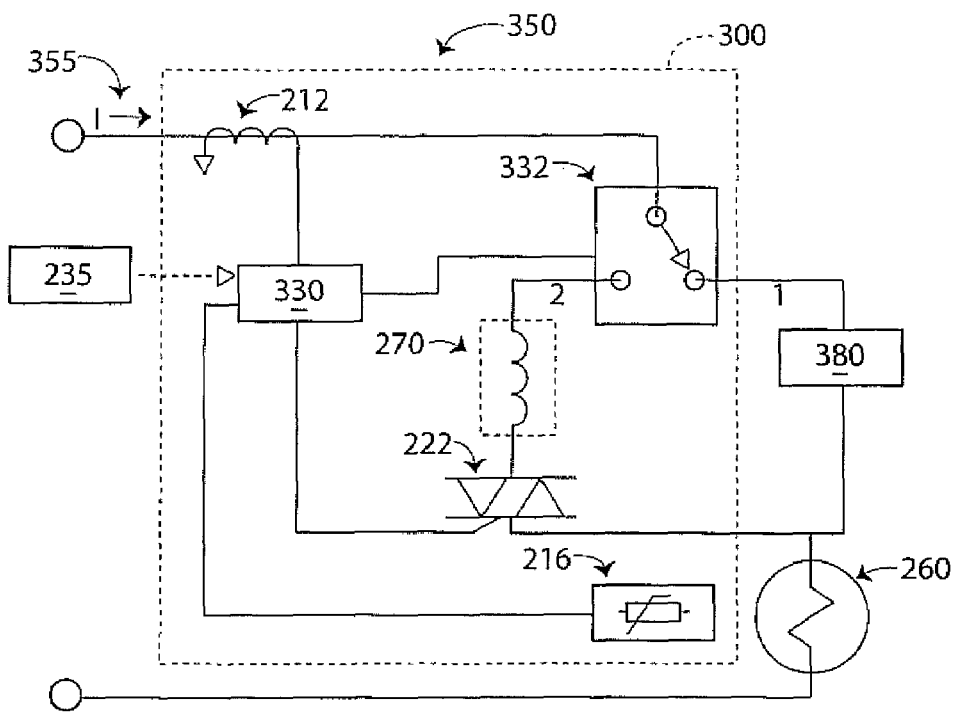
FIG. 3 is a diagram of a second exemplary circuit for the system for current and/or temperature control of light fixtures shown in FIG. 1.

FIG. 3 shows a diagram of a second exemplary circuit 300 for the system 100 for current and/or temperature control of light fixtures shown in FIG. 1. Similar to the system 100 of FIG. 1, the exemplary circuit 300 may be in communication with and/or integrated within a light fixture circuit 350. Similar to the circuit 200 of FIG. 2, the circuit 300 may include a current sensor 212 and alternatively or additionally include a temperature sensor 216, which were discussed above with respect to FIG. 2. The circuit 300 also includes a triac 222, which was also discussed above for FIG. 2.

The circuit 300 further includes a controller 330, which is similar to the controller 230 discussed above for FIG. 2, but also includes a relay 332, which may be integrated or separate (as depicted) from the controller 330. As depicted in FIG. 3, the controller 330 may be in communication with the current sensor 212 and/or temperature sensor 216 and also in communication with the triac 222, the relay 332, and, in some embodiments, a remote control 235, which was also discussed above for FIG. 2. As also depicted, the relay 332 can include a switch (contact, terminal, etc.) that can direct the current flow 355 through one of at least two paths 1, 2 when the relay is operated. Relays are known in the art, including how to make and use them with respect to embodiments of the invention.

The addition of the relay 332 to the controller 330 allows the triac 222 to be bypassed through additional circuitry 380 that may be included with the light fixture circuit 350. This additional circuitry 380 may include a direct path (e.g., short circuit) to the light source 260 or another circuit (device, system, etc.) that may affect the operation of the light source, such as a dimmer circuit (not depicted). By providing a bypass of the triac 222, the relay allows such additional circuitry 380 to be used while avoiding interference or other undesirable characteristics that may occur if the triac 222 and the additional circuitry 380 were connected or otherwise operated together. For example, if the additional circuitry 380 is a dimmer that also includes a triac and RF coil, it is known in the art that the operation of such additional circuitry 380 in connection with the triac 222, as well as the RF coil 270, may cause undesirable operation of the light source 260 and/or other components of the circuit 300 or light fixture circuit 350. Some examples of the operation of the controller 330 and relay 332 will be further discussed below with respect to FIGS. 5-8.

The light fixture circuit 350, which the circuit 300 may be in communication with and/or integrated within, can include a light source 260 and RF coil 270 similar to the light fixture circuit 250 of FIG. 2. Details of the light source 260 and RF coil 270 were discussed above with respect to FIG. 2. As depicted in FIG. 3, the RF coil 270 (e.g., along with the triac 222) can be switched out of the light fixture circuit 350 (e.g., bypassed) by the relay 332 in some embodiments of the invention as discussed above.

Figure 4:
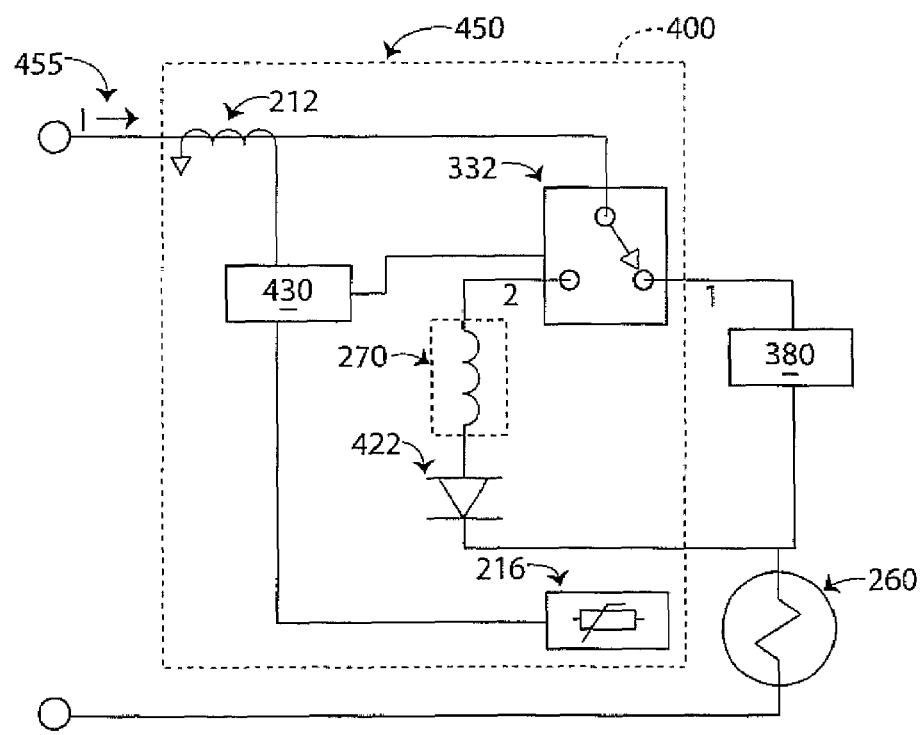
FIG. 4 is a diagram of a third exemplary circuit for the system for current and/or temperature control of light fixtures shown in FIG. 1.

FIG. 4 shows a diagram of a third exemplary circuit 400 for the system 100 for current and/or temperature control of light fixtures shown in FIG. 1. Similar to the system 100 of FIG. 1, the exemplary circuit 400 may be in communication with and/or integrated within a light fixture circuit 450. The circuit 400 is similar to the circuit 300 of FIG. 3 and includes a current sensor 212 and/or temperature sensor 216 and a relay 332, which were described above for FIG. 3. The circuit 400 also includes a controller 430 that is similar to the controller 330 described above except that it is not in communication with a triac. Some examples of the operation of the controller 430 and relay 332 will be further discussed below with respect to FIGS. 5-8.

Instead of a triac, the circuit 400 includes a diode 422, which is another example of the variable switch 120 of FIG. 1. Diodes are known in the art, including how to make and use them with respect to embodiments of the invention. Therefore, it will be apparent in light of the disclosure herein that the diode 422 can vary the current flow 455 (e.g., between full flow and no flow) when it is switched into operation by the relay 332 resulting in a current flow 455 through the light source 260 that is, for example, approximately half of the original current flow 455 in the light fixture circuit 450.

Similar to the light fixture circuit 350 of FIG. 3, the light fixture circuit 450 can include a light source 260 and RF coil 270. Furthermore, one path 1 of the relay 332 may be in communication with additional circuitry 380 as depicted, which may be included in the light fixture circuit 450. The light source 260, RF coil 270, and additional circuitry 380 were described above, for example, with respect to FIG. 3.

It is noted with respect to the foregoing discussion of FIGS. 1-4 that various systems and/or circuits were described that included elements in various positions relative to each other. However, it should be understood and apparent in light of the disclosure herein that such described elements (as well as other elements) may be positioned alternatively in numerous variations within the scope of the invention. It should also be understood that the term light fixture as used herein may refer to a system (structure, device, etc.) that includes a light fixture circuit or that the two terms may be used interchangeably to refer to an overall system or portions thereof, such as a circuit portion.

Figure 7:
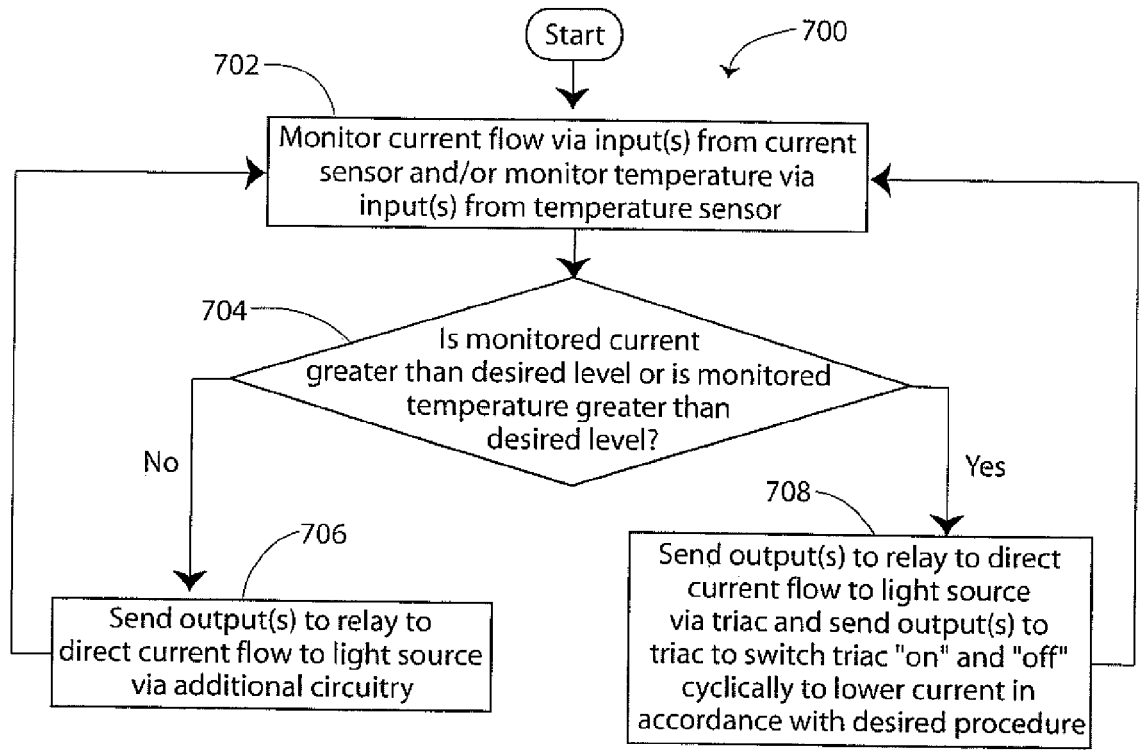
FIG. 7 is a flowchart diagram of a second sub-method of the method for current and/or temperature control of light fixtures shown in FIG. 5.
Figure 8:
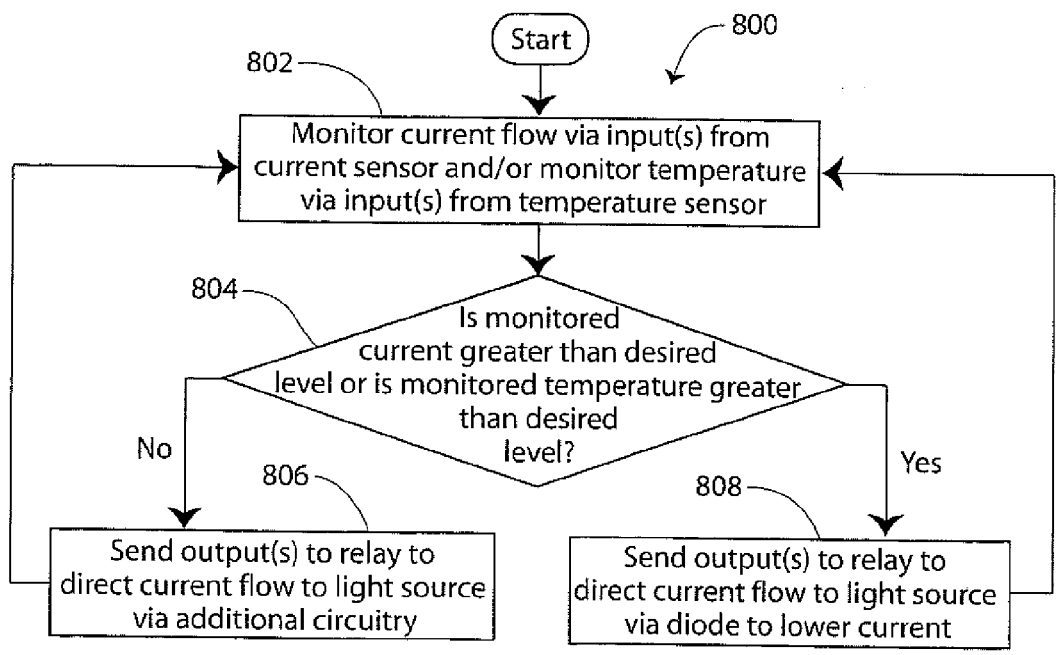
FIG. 8 is a flowchart diagram of a third sub-method of the method for current and/or temperature control of light fixtures shown in FIG. 5.

The following description of exemplary embodiments of the invention with respect to FIGS. 5-8 may include exemplary references to elements discussed above with respect to FIGS. 1-5 as applicable to facilitate the description. However, it should be understood that such references are exemplary and not limiting with respect to the scope of exemplary embodiments of the invention. Furthermore, it should be understood that some steps of the exemplary methods (sub-methods, processes, etc.) described below may be performed before or after other steps of the methods (respectively), or in parallel or combination with other steps, without departing from the scope of exemplary embodiments of the invention.

FIG. 5 shows a flowchart diagram of a method 500 for current and/or temperature control of light fixtures. This method may be performed, for example, by the controller 130 and/or other elements of the system 100, which were discussed above for FIG. 1. The method 500 begins with step 502 in which the controller 130 monitor one or more characteristics of the light fixture circuit 150 and/or light fixture via one or more inputs from the sensor 110. The method proceeds to step 504 in which the controller 130 determine whether one or more of the monitored characteristics meets a corresponding condition. For example, the controller 130 may be configured to compare the input(s) from the sensor 110 to one or more predetermined values to determine if the input(s) meet a predetermined comparison condition (e.g., less than, equal, greater than, etc.).

If a corresponding condition is not met in step 504, the method proceeds to step 506 in which the controller 130 respond by sending one or more outputs to the variable switch 120 to cause it to permit a normal and/or existing current flow 155 to the load 160. The method then proceeds from step 506 back to step 502. However, if a corresponding condition is met in step 504, the method proceeds to step 508 in which the controller 130 respond by sending one or more outputs to the variable switch 120 to cause it to modify (e.g., decrease, increase, etc.) the current flow 155 to the load 160. As discussed below, the modification of the current flow 155 may be performed according to a desired procedure. The method then proceeds from step 508 back to step 502.

FIG. 6 shows a flowchart diagram of a first sub-method 600 of the method 500 for current and/or temperature control of light fixtures shown in FIG. 5. This sub-method 600 may be performed, for example, by the controller 230 and/or other elements of the circuit 200, which were discussed above for FIG. 2. The sub-method 600 begins with step 602 in which the controller 230 monitors the current flow 255 via one or more inputs from the current sensor 212 and/or monitors the temperature (e.g., of or about one or more portions of the light fixture circuit 250 or light fixture) via one or more inputs from the temperature sensor 216 depending on if either one or both the sensors are included in the circuit 200.

The sub-method 600 proceeds to step 604 in which the controller 230 determines whether the monitored current is greater than a desired (e.g., predetermined, preset, etc.) level or determines whether the monitored temperature is greater than a desired level. If in step 604 the monitored current is not greater than the desired level or the monitored temperature is not greater than the desired level, the sub-method 600 proceeds to step 606 in which the controller 230 sends one or more outputs to the triac 222 to keep the triac 222 "on" and permit a normal (existing, desired, etc.) current flow 255 to the light source 260. For example, it is known in the art that a triac will conduct current once a sufficient (e.g., bias) voltage is applied to its gate terminal until the current drops below a threshold value. Therefore, in step 606, the controller 230 may apply such bias voltage to the gate terminal of the triac 222 cyclically as frequently as possible (e.g., at or about the 60 cycle per second frequency of a typical alternating current power source) so that the triac 222 conducts the current flow 255 as if it were essentially a closed switch or short circuit (e.g., there may be some interruption of the flow as the current drops below the threshold value while changing polarities). The sub-method 600 then proceeds from step 606 back to step 602.

However, if in step 604 the monitored current is greater than the desired level or the monitored temperature is greater than the desired level, the sub-method 600 proceeds to step 608 in which the controller 230 sends one or more outputs to the triac 222 to switch the triac 222 "on" and "off" cyclically to lower (reduce, decrease, etc.) the current flow 255 to the light source 260 in accordance with a desired procedure, examples of which are discussed below. For example, according to the same principle of operation of the triac 222 as described above, the controller 230 may apply a bias voltage to the gate terminal of the triac 222 cyclically at a slower frequency so that the triac 222 cycles between conducting current and not conducting current thereby effectively reducing the current flow 255 that travels to the lights source 260. The sub-method 600 then proceeds from step 608 back to step 602.

The controller 230 may perform such controlling (operations, functions, etc.) as described above for steps 602, 604, 606, 608 by numerous methods (processes, steps, etc.) depending on the elements included to configure the controller 230, which will be apparent based on the disclosure herein. For example, if the controller 230 is configured to include programmable logic, it may be programmed to perform such operations accordingly.

As mentioned above, the controller 230 may cause the triac 222 to operate to lower the current flow 255 according to a desired procedure (routine, protocol, etc.). One example of such a desired procedure is for the controller 230 to cause the triac 222 to reduce the current flow 255 by a predetermined (preset, precalculated, fixed, etc.) amount (e.g., a percentage such as 25%, 50%, 75%, etc.). Another example of such a desired procedure is for the controller 230 to cause the triac 222 to reduce the current flow 255 to a predetermined amount (e.g., 1 amp, 2 amps, etc.). Yet another example of such a desired procedure is for the controller 230 to cause the triac 222 to reduce the current flow 255 in order to maintain the temperature (e.g., of or about one or more portions of the light fixture circuit 250 or light fixture) below a certain maximum (e.g., less than 90 degrees Celsius). Such procedures as the foregoing may include the controller maintaining and/or modifying the operation of the triac 222 dependent on the resultant current flow 255 that is sensed by the current sensor 212 and/or on the resultant temperature that is sensed by the temperature sensor 216. Furthermore, other such desired procedures to reduce the current flow 255 may be performed by the controller, which will be apparent based on the disclosure herein.

FIG. 7 shows a flowchart diagram of a second sub-method 700 of the method 500 for current and/or temperature control of light fixtures shown in FIG. 5. This sub-method 700 may be performed, for example, by the controller 330 and/or other elements of the circuit 300, which were discussed above for FIG. 3. The steps 702, 704 of the sub-method 700 are essentially the same as steps 602, 604 of the sub-method 600 described above. In step 706 of the sub-method 700 (which is reached if the monitored current is not greater than the desired level or the monitored temperature is not greater than the desired level in step 704), the controller 330 sends one or more outputs to the relay 332 to cause it to switch the current flow 355 through path 1 to the light source 260 via the additional circuitry 380. During this step 706, the controller 330 may or may not also send one or more outputs to the triac 222, since it is bypassed from the light fixture circuit 350 via the relay 332 and additional circuitry 380. The sub-method 700 then proceeds from step 706 back to step 702.

In step 708 of the sub-method 700 (which is reached if the monitored current is greater than the desired level or the monitored temperature is greater than the desired level in step 704), the controller 330 sends one or more outputs to the relay 332 to cause it to switch the current flow 355 through path 2 to the light source 260 via the triac 222. Also during this step 706, the controller 330 sends one or more outputs to the triac 222 to switch the triac 222 "on" and "off" cyclically to lower the current flow 355 to the light source 260 in accordance with a desired procedure similar to as described above for step 608. The sub-method 700 then proceeds from step 708 back to step 702.

FIG. 8 shows a flowchart diagram of a third sub-method 800 of the method 500 for current and/or temperature control of light fixtures shown in FIG. 5. This sub-method 800 may be performed, for example, by the controller 430 and/or other elements of the circuit 400, which were discussed above for FIG. 4. The steps 802, 804, 806 of the sub-method 800 are essentially the same as steps 702, 704, 706 of the sub-method 700 described above. In step 808 of the sub-method 800 (which is reached if the monitored current is greater than the desired level or the monitored temperature is greater than the desired level in step 804), the controller 330 sends one or more outputs to the relay 332 to cause it to switch the current flow 455 through path 2 to the light source 260 via the diode 422. As discussed above, the diode 422 can reduce the current flow 455, for example, to approximately half of the previous current flow 455 in the light fixture circuit 450. The sub-method 800 then proceeds from step 808 back to step 802.

Figure 9:
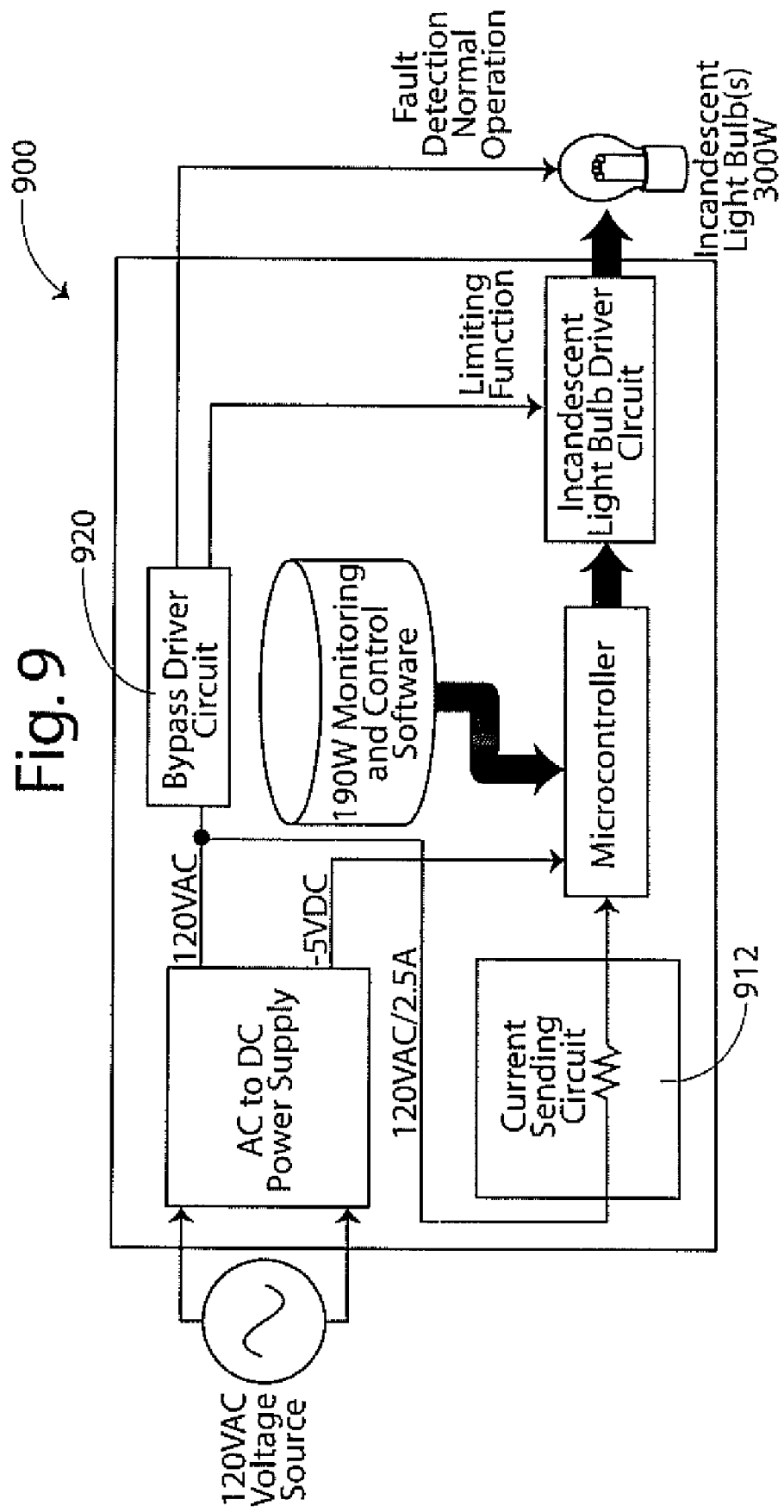
FIG. 9 is a block diagram of a fourth exemplary of a system for current and/or temperature control of light fixtures.
Figure 10:
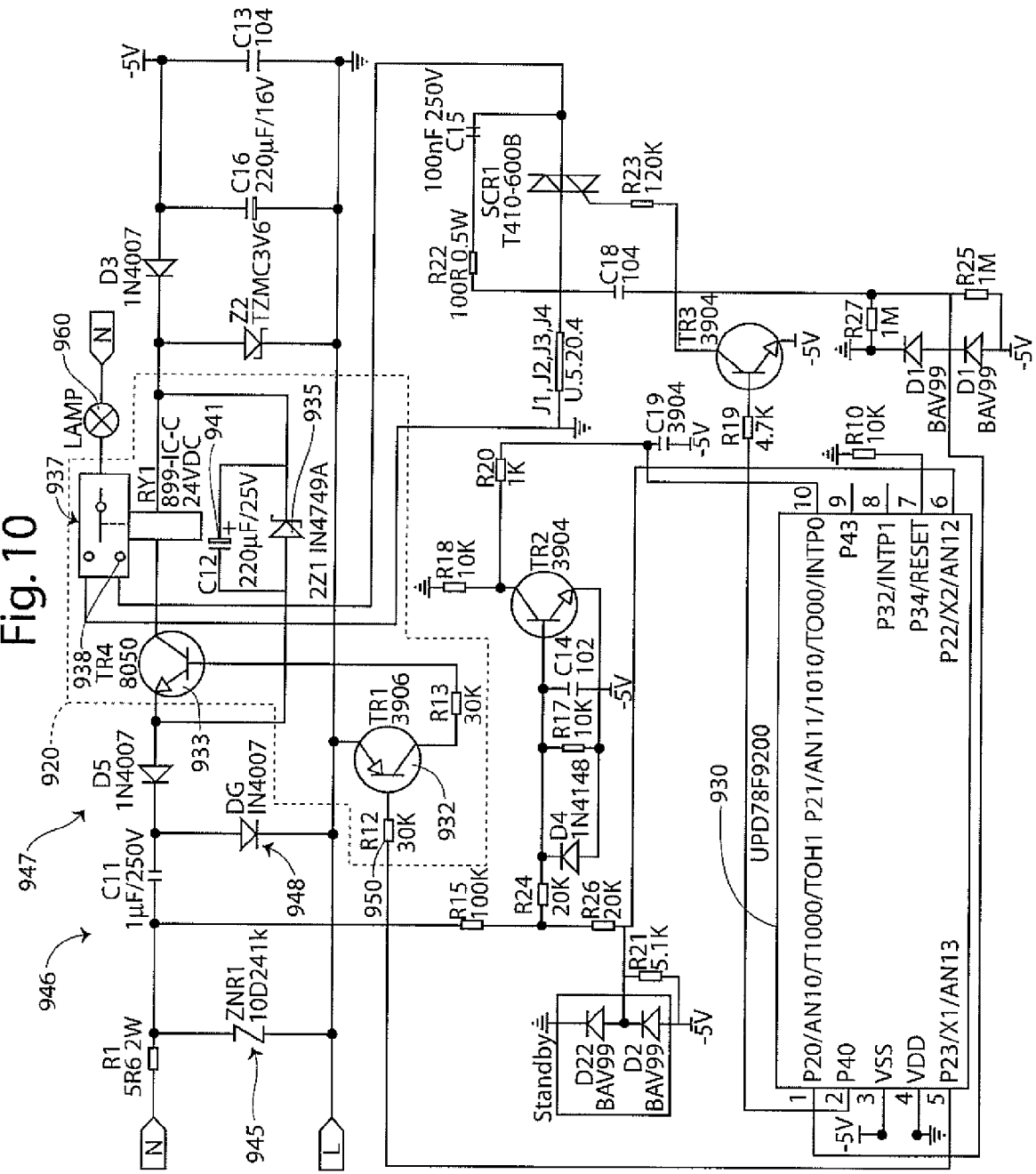
FIG. 10 is a diagram of the system for current and/or temperature control of light fixtures shown in FIG. 9.

FIGS. 9 and 10 show a diagram of a fourth exemplary circuit 900 for the system 100 for current and/or temperature control of light fixtures. Similar to the system 100 of FIG. 1, the exemplary circuit 900 may be in communication with and/or integrated within a light fixture circuit 350. Similar to the circuit 200 of FIG. 2, the circuit 900 may include a current sensor or current sensing circuit 912 and alternatively or additionally include a temperature sensor, which were discussed above with respect to FIG. 2. The circuit 900 also includes a bypass driver circuit or bypass 920 which is used to switch to a normal light control operation upon the limiting controller circuit failing wherein normal operation consists of the lights being at the full power dissipation, as described in more detail hereinafter.

To insure that the light limiter controller function will not impeded lighting in a specific environment due to a subcircuit failure, a fail-safe mechanism or subcircuit is utilized. Should a limiting controller subcircuit failure occur, the environment load or lights operate normally, i.e., the lights are illuminated to full intensity without the circuit reducing the current.

FIG. 10 shows a detail of circuit 900 including bypass 920. In use, upon the circuit 900 being energized with an active neutral and line circuit from a conventional power source, the controller 930 provides a control command signal (0V) to switch a PNP type transistor 932 and NPN type transistor 933 "on". The collector of transistor 933 is at a lower voltage potential of 24 VDC supplied by a zener diode 935. The coil of the electromechanical relay 937 is energized (turned "on") to allow the electrical contacts of the electromechanical relay 937 to switch from NC (normally closed) to NO (normally open), thereby connecting the light bulb 960 to the triad light bulb driver anode pin 938.

A parallel capacitor 941 provides transient suppression of the 60 Hz low frequency line voltage coming from the line and neutral circuit wires attached to the controllers power supply through capacitor 944, varistor 945, capacitor 946, diode 947 and diode 948. Zener diode 935 provides the appropriate voltage rail of 6 VDC for transistor 932 to operate properly.

With this electrical connection established, the controller 930 electrically monitors and regulates the amount of current that flows through the filaments of various watt rated incandescent light bulbs. If a maximum current of 2.5 A (0.190 W) (for example) is sensed by the sensing subcircuit, the electrical connection established by relay 937 switching contacts provides an appropriate dimming control signal driven by the triac light bulb driver subcircuit. At this point, the wired incandescent light bulbs intensity will be commanded to be full bright. If there is either an open or short circuit condition attributed to aging or failed electronic components and/or circuit board trace(s) deterioration, the controller provides either a +5V signal or a Hi Z (impedance) load to a resistor 950, thereby commanding transistor 932 and 933 to switch "off". The voltage potential at the low side of relay 937/transistor 933 collector circuit will be equivalent to the 24 VDC power supply source provided by the zener diode 935, thereby de-energizing (turning "off") the electromechanical relay's coil. The single pole single throw electrical contacts are then switched from NO to NC. The electrically wired incandescent light bulb 960 load will then be disconnected from the trial light bulb driver subcircuit. The electrical ground is then connected to the light bulb thereby establishing a closed electrical circuit turning it "on" at full intensity with a normal current. The term normal current is intend to represent a current that is not altered, reduced, modified, or otherwise changed to substantially reduce the current, as for dimming purposes. Of course, some internal resistance may occur as well as other current changes as a result of the electrical components utilized in the circuitry, especially the bypass circuitry. However, these small changes in the current do not substantially change the current and as such the current is still intended to equate a normal current or a current without regulatory decreasing.

It should be understood that the bypass circuit or other bypass circuit may be utilized with any of the embodiments shown herein as well as equivalent circuits.

It is thus seen that a system and method to control the current and/or temperature of light fixtures is now provided to avoid a loss of operation and/or damage that may occur when a larger than rated light source is used with them, but that also bypasses the dimming operation of the circuit should a failure occur. It should be understood that the foregoing descriptions merely relate to exemplary, illustrative embodiments of the invention. Furthermore, various elements of the described exemplary embodiments may be known in the art or recognized by one of ordinary skill in the art based on the disclosure herein. Therefore, it should also be understood that various modifications may be made to exemplary embodiments described herein that are within the spirit and scope of the invention as set forth in the following claims.

The invention claimed is:

1. A system for current and/or temperature control of light fixtures, comprising:
   a sensor structured to be in communication with a light fixture, to sense a current flow or a temperature of the light fixture, and to communicate an input signal relative to the current flow or temperature;
   a variable switch structured to be in communication with the light fixture and regulate the current flow of the light fixture in response to a control signal;
   a controller in communication with the sensor and the variable switch and structured to monitor the input signal communicated by the sensor, to compare the input signal to a condition, and to communicate the control signal to the variable switch to control its operation, and
   a bypass circuit structured to apply a normal current to the light fixture should a failure occur with said sensor, said variable switch or said controller.

2. The system of claim 1, wherein the sensor comprises at least one of a current transformer, a thermistor, or a transducer.

3. The system of claim 1, wherein the condition is one of a predetermined current parameter or a predetermined temperature parameter.

4. The system of claim 1, wherein the variable switch comprises at least one of a triac, a diode, or a semi-conducting switch device.

5. The system of claim 1, wherein the variable switch and at least a portion of the controller comprise a dimmer circuit.

6. The system of claim 1, wherein the controller comprises at least one of a conductor, a resistor, a capacitor, a transformer, a transistor, a semiconductor, an integrated circuit, a chip, a circuit board, an electronic logic, a programmable logic, a microprocessor, or a computing processor.

7. The system of claim 1, wherein the controller is further structured to be in communication with and at least partially operated via a remote control.

8. The system of claim 1, wherein the controller is further structured to be in communication with the light fixture and to switch the current flow within the light fixture circuit between at least two paths, wherein one path is in communication with the variable switch.

9. The system of claim 1, further comprising a relay in communication with the controller and structured to be in communication with the light fixture and to switch the current flow within the light fixture circuit between at least two paths in response to a signal communicated from the controller, wherein one of the paths is in communication with the variable switch.

10. A method for current and/or temperature control of light fixtures, comprising:
    providing a sensor structured to be in communication with a light fixture, to sense a current flow or a temperature of the light fixture, and to communicate an input signal relative to the sensed current flow or temperature;
    providing a variable switch structured to be in communication with the light fixture and regulate the current flow of the light fixture in response to a control signal;
    providing a controller in communication with the sensor and the variable switch and structured to monitor the input signal communicated by the sensor, to compare the input signal to a condition, and to communicate the control signal to the variable switch to control its operation;
    monitoring the current flow or the temperature of the light fixture via communication of the input signal from the sensor to the controller;
    regulating the current flow of the light fixture in response to the controller determining that the input signal meets the condition via the controller communicating the control signal to the variable switch, the regulating including a bypass mode should a malfunction occur with the sensor, controller, or monitoring of the current flow, the bypass mode applying a normal current to the light fixtures without regulatory decreasing the current.

11. The method of claim 10, wherein regulating the current flow comprises regulating the current flow of the light fixture in response to the controller determining that the input signal meets one of a condition of equaling or exceeding a predetermined current parameter or a condition of equaling or exceeding a predetermined temperature parameter.

12. The method of claim 10, wherein regulating the current flow comprises maintaining or reducing the current flow of the light fixture via the controller communicating the control signal to the variable switch.

13. The method of claim 10, wherein regulating the current flow comprises reducing the current flow according to a predetermined procedure comprising one of reducing it by a predetermined amount or reducing it to a predetermined amount.

14. The method of claim 10, wherein regulating the current flow comprises communicating the control signal to a dimmer circuit comprised of the variable switch and at least a portion of the controller.

15. A system for current and/or temperature control of light fixtures, comprising:
- sensor means for sensing the current flow or temperature of a light fixture and to communicate an input signal relative to the current flow or temperature;
- controller means for controlling the current flow in response to the input signal received from the sensor means, the controller means reducing the current in response to an overload input signal, the controller means also including a bypass for directing a normal current to the light fixture should a failure occur with the controller means.

16. The system of claim 15 wherein the controller means includes a variable switch structured to be in communication with the light fixture and regulate the current flow of the light fixture in response to a control signal.

17. The system of claim 16 wherein the controller means includes a controller in communication with the sensor and the variable switch and structured to monitor the input signal communicated by the sensor, to compare the input signal to a condition, and to communicate the control signal to the variable switch to control its operation.

18. The system of claim 17 wherein the bypass is structured to apply a normal current to the light fixture should a failure occur with said sensor, said variable switch or said controller.

19. The system of claim 15, wherein the sensor comprises at least one of a current transformer, a thermistor, or a transducer.

20. The system of claim 16, wherein the variable switch comprises at least one of a triac, a diode, or a semi-conducting switch device.

21. The system of claim 17, wherein the variable switch and at least a portion of the controller comprise a dimmer circuit.

* * * * *